United States Patent
Inagaki et al.

(10) Patent No.: US 7,147,334 B2
(45) Date of Patent: Dec. 12, 2006

(54) VEHICLE MIRROR ASSEMBLY AND METHOD FOR ASSEMBLING THE SAME

(75) Inventors: Bunji Inagaki, Kasugai (JP); Fuminori Teraoka, Aichi-ken (JP); Hiroki Iwasa, Komaki (JP); Kiyoharu Iga, Aichi-ken (JP); Michiyasu Yajima, Inuyama (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/752,836

(22) Filed: Jan. 3, 2001

(65) Prior Publication Data

US 2001/0007515 A1    Jul. 12, 2001

(30) Foreign Application Priority Data

Jan. 11, 2000    (JP)    ............................. 2000-002808

(51) Int. Cl.
*B60R 1/074*    (2006.01)
(52) U.S. Cl. ........................ 359/841; 359/900
(58) Field of Classification Search ................ 359/841, 359/871, 872, 873, 874, 875, 876, 877; 248/475.1, 248/476, 479, 481, 484, 487
See application file for complete search history.

(56) References Cited

U.S. PATENT DOCUMENTS

| | | | | |
|---|---|---|---|---|
| 4,125,244 A | * | 11/1978 | Lukey | ..................... 248/475.1 |
| 5,245,480 A | | 9/1993 | Polzer | ........................ 359/841 |
| 5,268,795 A | * | 12/1993 | Usami | ........................ 359/841 |
| 5,604,644 A | * | 2/1997 | Lang et al. | .................. 359/871 |
| 5,625,502 A | * | 4/1997 | Hoogenboom et al. | ..... 359/872 |
| 5,781,356 A | * | 7/1998 | Okada et al. | ............... 359/872 |
| 6,132,050 A | * | 10/2000 | Sakata et al. | ............... 359/841 |
| 6,481,858 B1 | * | 11/2002 | Inagaki et al. | .............. 359/841 |

FOREIGN PATENT DOCUMENTS

| | | |
|---|---|---|
| EP | 0 822 120 A2 | 2/1998 |
| EP | 0 846 595 A2 | 6/1998 |
| JP | 6-60546 | 8/1994 |
| JP | 8-58472 | 3/1996 |

OTHER PUBLICATIONS

European Search Report Dated Dec. 15, 2003.
*Notice of Reasons for Rejection*, dated Jun. 7, 2005, in corresponding Japanese Patent Application No. 2000-2808 (with English Translation).

* cited by examiner

*Primary Examiner*—Mark A. Robinson
(74) *Attorney, Agent, or Firm*—Roberts Mlotkowski & Hobbes; Thomas W. Cole (57) ABSTRACT

When a vehicle mirror assembly is assembled, a bracket is firstly set as an assembling reference member, disposed on a bracket jig and positioned with respect to the bracket jig. Next, a retracting unit, a mirror surface adjustment unit, a door mirror stay and a mirror are mounted to the bracket. Finally a door mirror visor is mounted to the bracket. The bracket is made common regardless of a vehicle type thus a fixed bracket jig can be used resulting in cost reduction. Further, as the door mirror visor is mounted in a final process, defects of the door mirror visor due to scratches can be reduced thereby improving the production efficiency.

19 Claims, 6 Drawing Sheets

VEHICLE MIRROR ASSEMBLY AND METHOD FOR ASSEMBLING THE SAME

BACKGROUND OF THE INVENTION

1. Field of the Invention

The present invention relates to a vehicle mirror assembly which is provided at, for example, a door of a vehicle and a method for assembling the same.

2. Description of the Related Art

Figure 7:
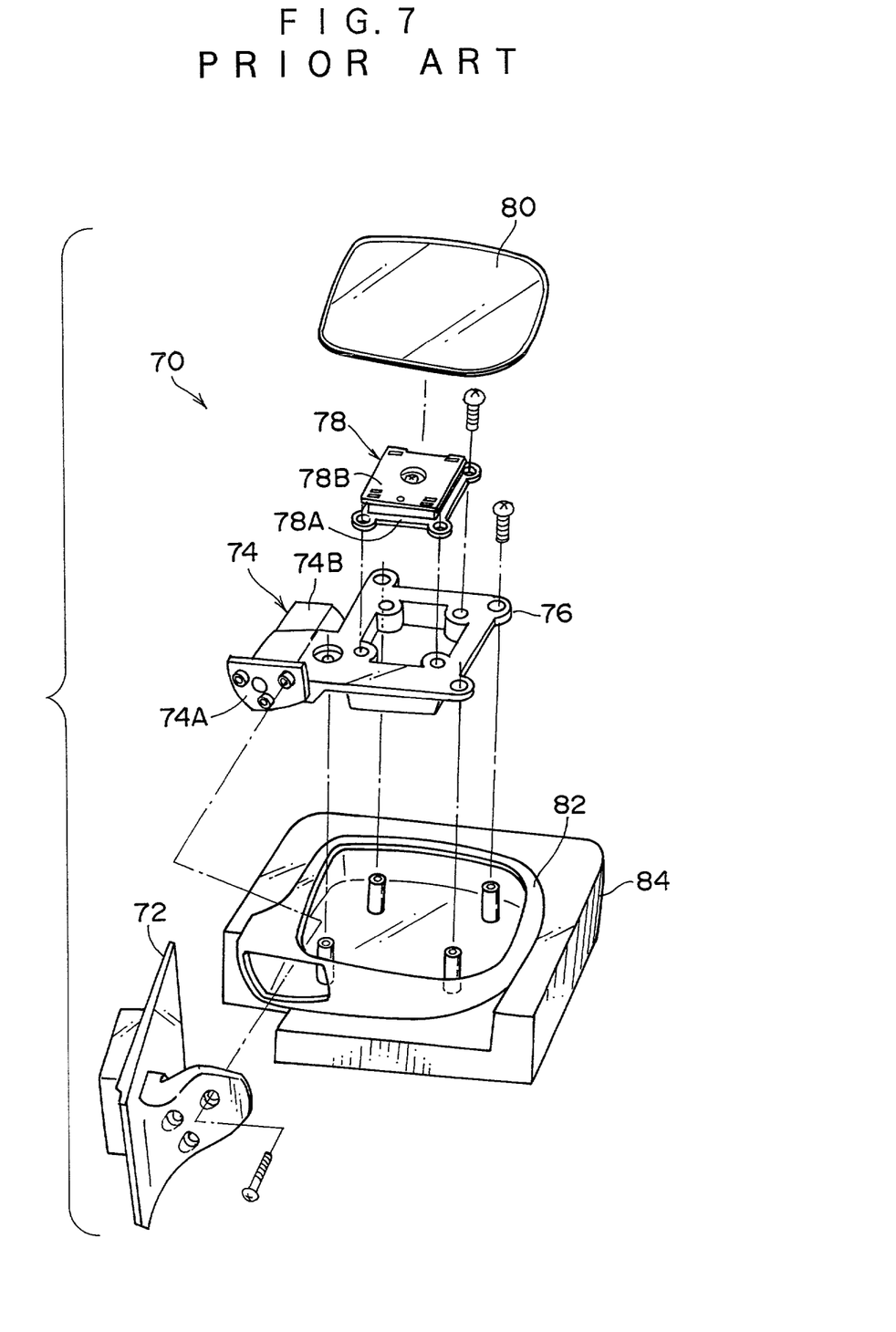
FIG. 7 is an exploded perspective view of a conventional vehicle mirror assembly.

For example, as shown in FIG. 7, a conventional vehicle mirror assembly 70 has a door mirror stay 72. The door mirror stay 72 is fixed to a door of a vehicle (not shown). A stand 74A of a retracting unit 74 is fixed to the door mirror stay 72. The retracting unit 74 has a rotating portion 74B at the vehicle upward side of the stand 74A. The rotating portion 74B is rotatable with respect to the stand 74A. A bracket 76 is connected to the stand 74A. A fixing portion 78A of a mirror surface adjustment unit 78 is fixed to the bracket 76. The mirror surface adjustment unit 78 has a retaining plate 78B at the vehicle rear side of the fixing portion 78A. A mirror 80 for viewing the region substantially at the rear of a vehicle is held by the retaining plate 78B. The retaining plate 78B can be tilted with respect to the fixing portion 78A. A door mirror visor 82 is fixed to the bracket 76. The door mirror visor 82 covers the retracting unit 74, the bracket 76, the mirror surface adjustment unit 78 and the mirror 80 so as to form the appearance of the vehicle mirror assembly 70 as a design surface.

In such vehicle mirror assembly 70, the retaining plate 78B is tilted with respect to the fixing portion 78A of the mirror surface adjustment unit 78 thereby adjusting a mirror surface angle of the mirror 80. Further, the rotating portion 74B is rotated with respect to the stand 74A of the retracting unit 74 so that the door mirror visor 82 is rotated together with the rotating portion 74B. In this way, the mirror 80 is retracted or extended.

When such vehicle mirror assembly 70 is assembled, the door mirror visor 82 is set as an assembling reference member. Then the door mirror visor 82 is disposed on a door mirror visor jig 84 and positioned with respect thereto. The fixing portion 78A of the mirror surface adjustment unit 78 is mounted to the bracket 76 to which the rotating portion 74B of the retracting unit 74 is fixed. Next, the bracket 76 is mounted to the interior of the door mirror visor 82 which is disposed on the door mirror visor jig 84. Thereafter, with the door mirror visor 82 being disposed on the door mirror visor jig 84, the mirror 80 is mounted to the retaining plate 78B of the mirror surface adjustment unit 78 and the door mirror stay 72 is mounted to the stand 74A of the retracting unit 74.

However, in such assembling method of the vehicle mirror assembly 70, as described above, since the door mirror visor 82 is disposed on the door mirror visor 82 and positioned with respect thereto, the door mirror visor jig 84 needs to be formed so as to coincide perfectly the shape or the size of the door mirror visor 82. That is, if the door mirror visor 82 having different shape or size is used, the door mirror visor jig 84 having different shape or size is correspondingly needed. As a result, there has been the problem that the door mirror visor jig 84 must be provided for each shape or size of the door mirror visor 82 (for each vehicle type) resulting in high cost.

As described above, with the door mirror visor 82 being disposed on the door mirror visor jig 84, not only the bracket 76 is mounted to the door mirror visor 82, but also the mirror 80 is mounted to the mirror surface adjustment unit 78 which is mounted to the bracket 76 and the door mirror stay 72 is mounted to the retracting unit 74 which is mounted to the bracket 76. Thus there are many possibilities that the door mirror visor 82 is scratched by the door mirror visor jig 84. There has also been the problem that as the door mirror visor is a component whose appearance is a design, if scratches are formed at the door mirror visor 82, the door mirror visor 82 becomes a defective resulting in inferior production efficiency.

SUMMARY OF THE INVENTION

An object of the present invention is to provide a mirror assembly in which possibilities that a mirror visor is damaged at a time of assembling the mirror assembly can be lessened as compared with conventional cases, and a method for assembling the same.

Another object of the present invention is to provide a mirror assembly which allows for the rationalization of an assembling process and a method for assembling the same.

Still another object of the present invention is to provide a mirror assembly which can be assembled at an inexpensive cost and a method for assembling the same.

In accordance an aspect of a vehicle mirror assembly relating to the present invention, the assembly comprises (A) a mirror having a back surface and an outer peripheral surface; and (B) a mirror visor supporting the mirror, the mirror visor having a visor cover opposing the back surface of the mirror, and a visor rim covering the outer peripheral surface of the mirror.

In accordance with an aspect of a method for assembling a vehicle mirror assembly relating to the present invention, the assembly includes a mirror having an outer peripheral surface and a back surface, a mirror visor having a visor cover for covering the back surface of the mirror, and a visor rim for covering the outer peripheral surface of the mirror, and a bracket having opposite surfaces, the method comprising: (a) mounting the visor rim to one surface of the bracket; and (b) mounting the visor cover to one of the other surface of the bracket and the visor rim from the other surface side of the bracket.

In accordance with another aspect of a method for assembling a vehicle mirror assembly relating to the present invention, the assembly includes a mirror having an outer peripheral surface and a back surface, a mirror visor for covering the back surface and outer peripheral surfaces of the mirror and a bracket having opposite surfaces for accommodation within the mirror visor, the method comprising: (a) mounting the mirror to one surface of the bracket; and (b) mounting the mirror visor to the other surface of the bracket from the other surface side of the bracket.

DESCRIPTION OF THE PREFERRED EMBODIMENTS

Figure 1:
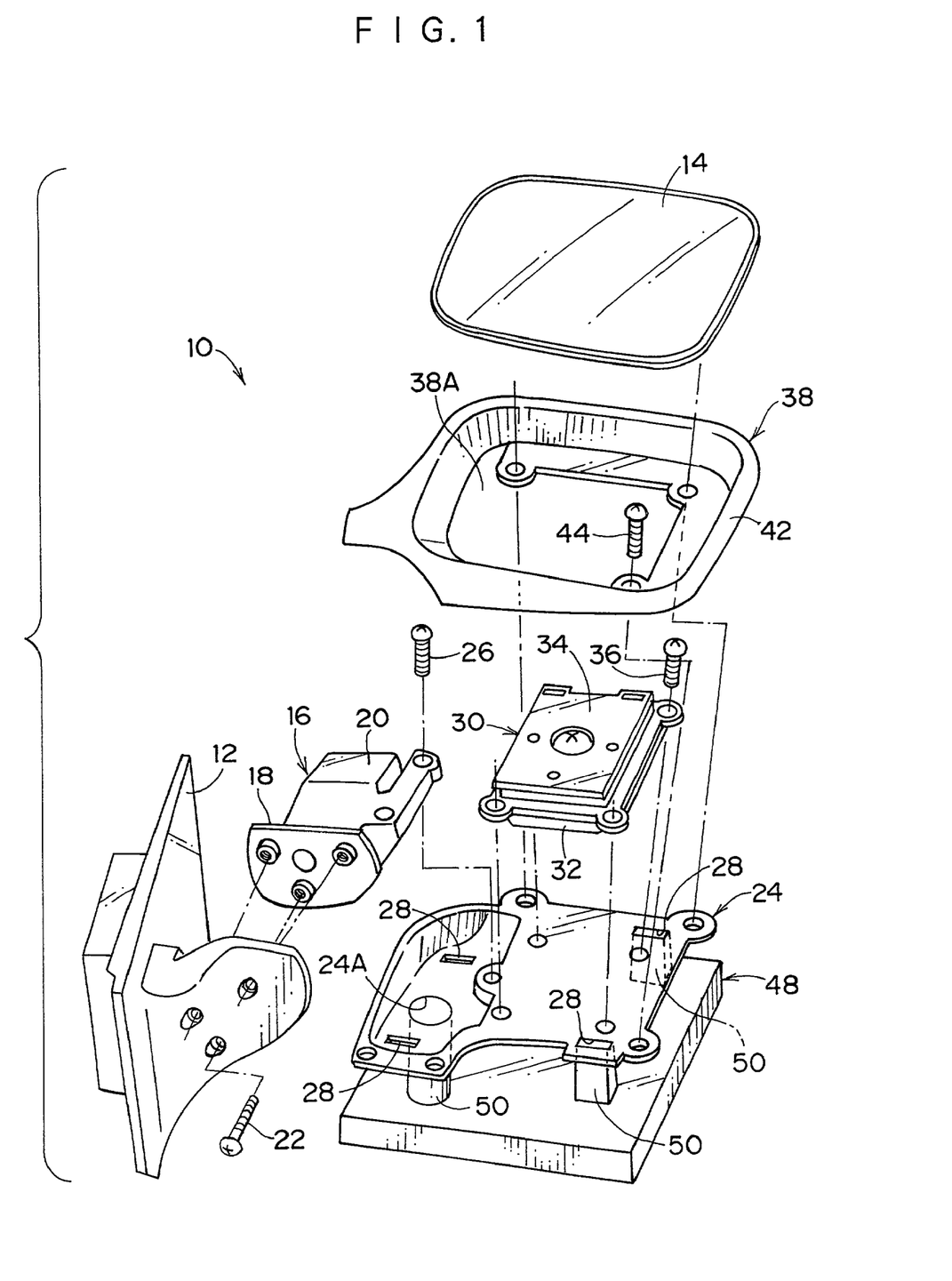
FIG. 1 is an exploded perspective view of main portions of a vehicle mirror assembly which is assembled using an assembling method of a vehicle mirror assembly of the present invention.
Figure 2:
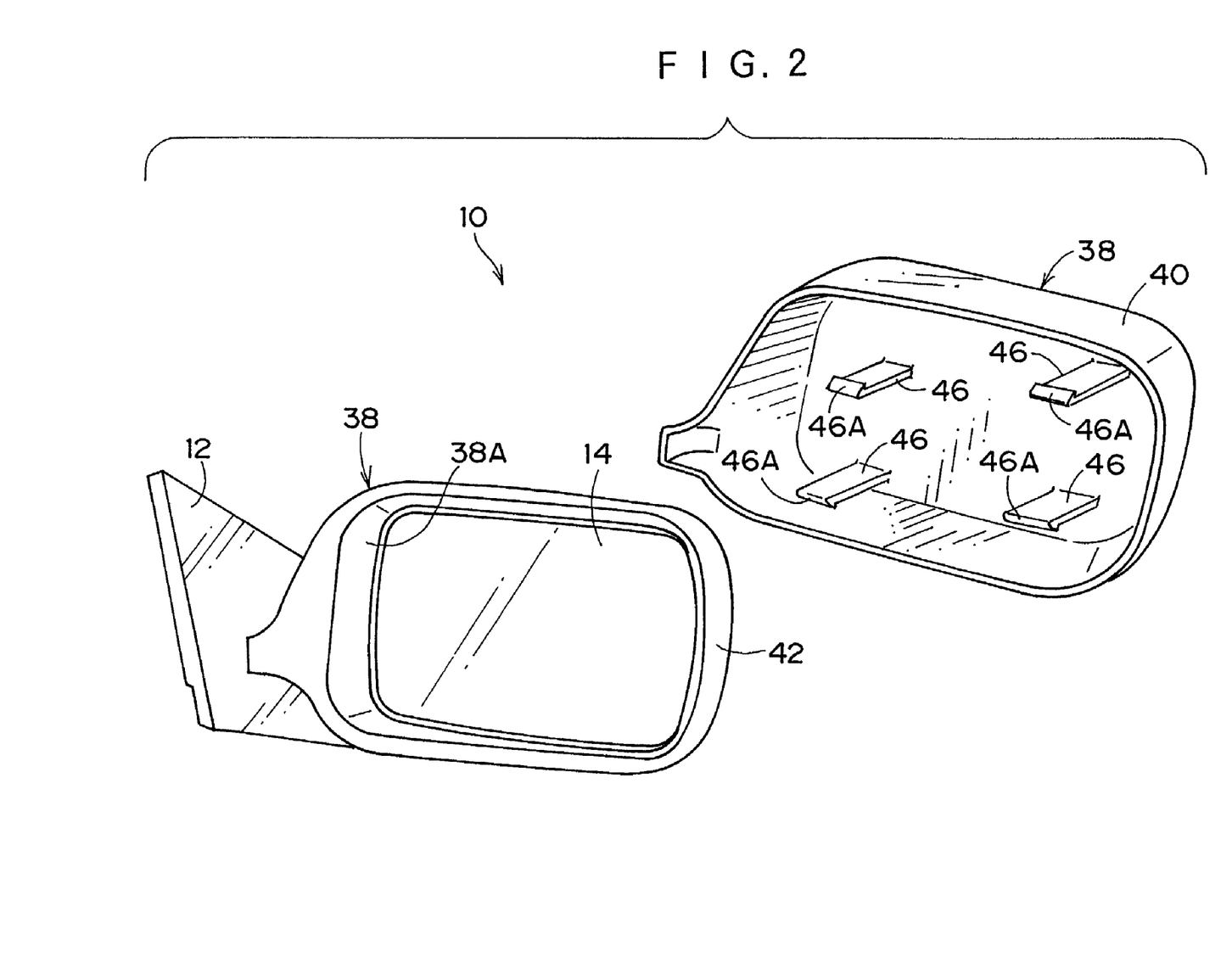
FIG. 2 is an exploded perspective view of the vehicle mirror assembly from the vehicle rear side.

FIG. 1 is an exploded perspective view of main portions of a vehicle mirror assembly 10 which is assembled using an assembling method of a vehicle mirror assembly of the present invention. FIG. 2 is an exploded perspective view of the vehicle mirror assembly 10 from the vehicle rear side.

The vehicle mirror assembly 10 has a door mirror stay 12. The door mirror stay 12 is used to fix a mirror 14 for viewing the region substantially the rear of a vehicle to the vehicle, and is fixed to a door of the vehicle (not shown).

A retracting unit 16 is provided at the vehicle upward side of the door mirror stay 12. The retracting unit 16 has a stand 18 at the vehicle downward side thereof and a rotating portion 20 at the vehicle upward side thereof. The stand 18 is fixed to the door mirror stay 12 by a predetermined number of screws 22 (in the present embodiment, three screws 22) so that the retracting unit 16 is supported by the door mirror stay 12. The rotating portion 20 is rotatable with respect to the stand 18.

A plate-shaped bracket 24 is provided at the vehicle front side of the retracting unit 16. The bracket 24 is fixed to the rotating portion 20 of the retracting unit 16 by a predetermined number of screws 26 (in the present embodiment, three screws 26) so as to be connected to the retracting unit 16. A plurality of engaging holes 28 (in the present embodiment, four engaging holes 28) are formed at the bracket 24. A plurality of engaging pawls 46 of the door mirror visor 38 engage with respective engaging holes 28 as described later.

A mirror surface adjustment unit 30 is provided at the vehicle rear side of the bracket 24. The mirror surface adjustment unit 30 has a fixing portion 32 at the vehicle front side thereof and a retaining plate 34 at the vehicle rear side thereof. The fixing portion 32 is fixed to the bracket 24 by a predetermined number of screws 36 (in the present embodiment, four screws 36) so that the mirror surface adjustment unit 30 is fixed to the bracket 24. A mirror 14 is held by the retaining plate 34. The retaining plate 34 can be tilted with respect to the fixing portion 32.

A door mirror visor 38 is provided on the peripheries of the mirror 14, the retracting unit 16, the bracket 24 and the mirror surface adjustment unit 30. The door mirror visor 38 is made hollow and has an opening portion 38A which is open toward the vehicle rear side. With the mirror 14 being disposed at the opening portion 38A, the mirror 14, the retracting unit 16, the bracket 24 and the mirror surface adjustment unit 30 are covered by the door mirror visor 38. Thus the door mirror visor 38 forms the appearance of the vehicle mirror assembly 10 as a design surface.

The door mirror visor 38 is divided into a visor cover 40 at the vehicle front side thereof and a visor rim 42 at the vehicle rear side thereof. The visor cover 40 is fitted into the visor rim 42 so that the door mirror visor 38 is formed. The visor rim 42 is fixed to the bracket 24 at the vehicle rear side thereof by a predetermined number of screws 44 (in the present embodiment, three screws 44). A predetermined number of engaging pawls 46 (in the present embodiment, four engaging pawls 46) are formed within the visor cover 40 so as to correspond to the above-mentioned engaging holes 28 of the bracket 24. Each engaging pawl 46 protrudes toward the vehicle rear side and a hook portion 46A is formed at a distal end of each engaging pawl 46. The hook portion 46A is formed by enlarging the diameter of the distal end of the engaging pawl 46. The engaging pawl 46 engages with the engaging hole 28 at the hook portion 46A. The visor cover 40 is mounted to the bracket 24 and the visor cover 40 is fitted into the visor rim 42. In this way, the door mirror visor 38 is mounted to the bracket 24.

Next, an operation of the present embodiment will be described.

In the vehicle mirror assembly 10 with the above-described structure, the retaining plate 34 of the mirror surface adjustment unit 30 is tilted with respect to the fixing portion 32 so that a mirror surface angle of the mirror 14 is adjusted. The rotating portion 20 is rotated with respect to the stand 18 of the retracting unit 16 so that the door mirror visor 38 is rotated together with the rotating portion 20 thereby the mirror 14 is retracted or extended.

Next, an assembling procedure of the vehicle mirror assembly 10 of the present embodiment will be explained.

Figure 3:
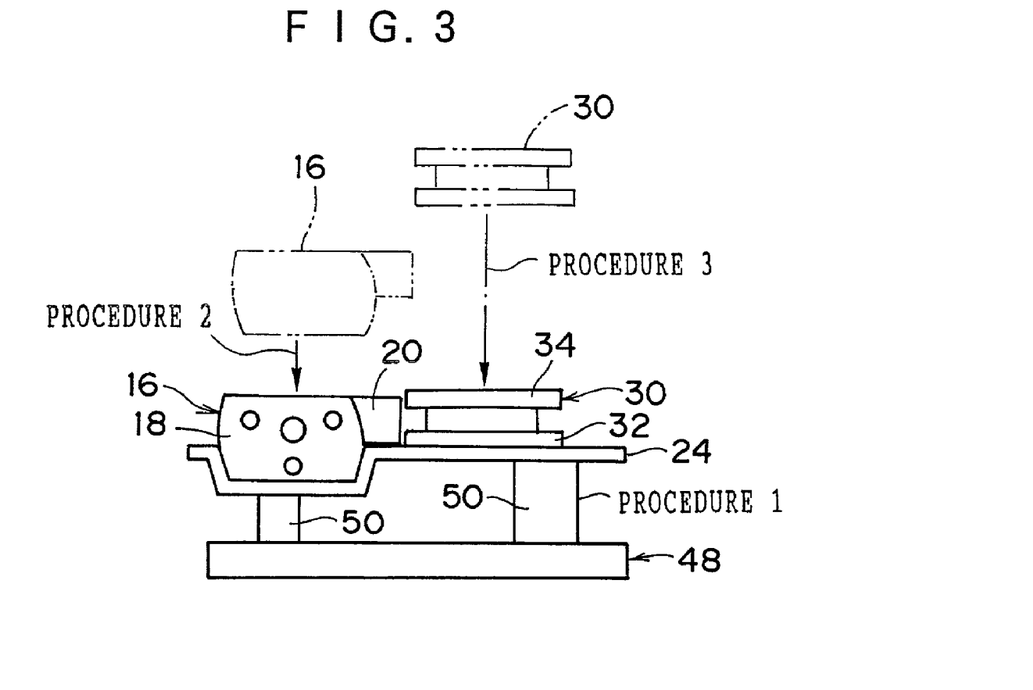
FIG. 3 is a bottom view when a bracket of the vehicle mirror assembly is disposed on a bracket jig and a retracting unit and a mirror surface adjustment unit are mounted to the bracket.

In a first step, the bracket 24 is set as an assembling reference member and is disposed on the bracket jig 48 (which hereinafter is referred to as a first procedure). A plurality of protrusions 50 (in the present embodiment three protrusions 50) are formed at the bracket jig 48. Respective distal ends of the protrusions 50 are inserted into the engaging holes 28 of the bracket 24 and a positioning hole 24A which is formed at the bracket 24 so as to correspond to one of the protrusions 50. Thus the bracket 24 is disposed on the bracket jig 48 and positioned with respect thereto.

Next, as shown in FIG. 3 in detail, in a second step, the rotating portion 20 of the retracting unit 16 is fixed to the bracket 24 by a predetermined number of screws 26 (which hereinafter is referred to as a second procedure). The fixing portion 32 of the mirror surface adjustment unit 30 is fixed to the bracket 24 by a predetermined number of screws 36 (which hereinafter is referred to as a third procedure).

Figure 4:
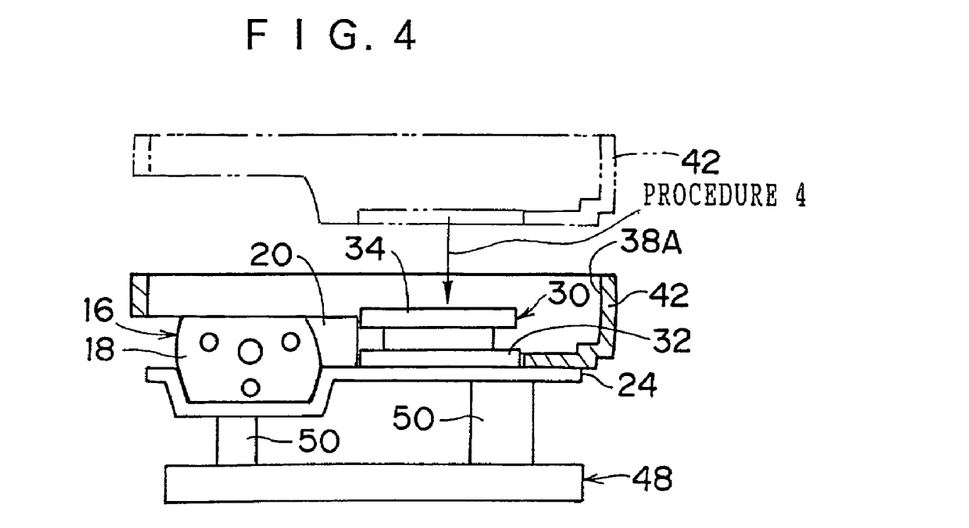
FIG. 4 is a bottom view when a visor rim is mounted to the bracket of the vehicle mirror assembly.

Further, as shown in FIG. 4 in detail, the visor rim 42 is fixed to the bracket 24 by a predetermined number of screws 44 (which hereinafter is referred to as a fourth procedure).

Figure 5:
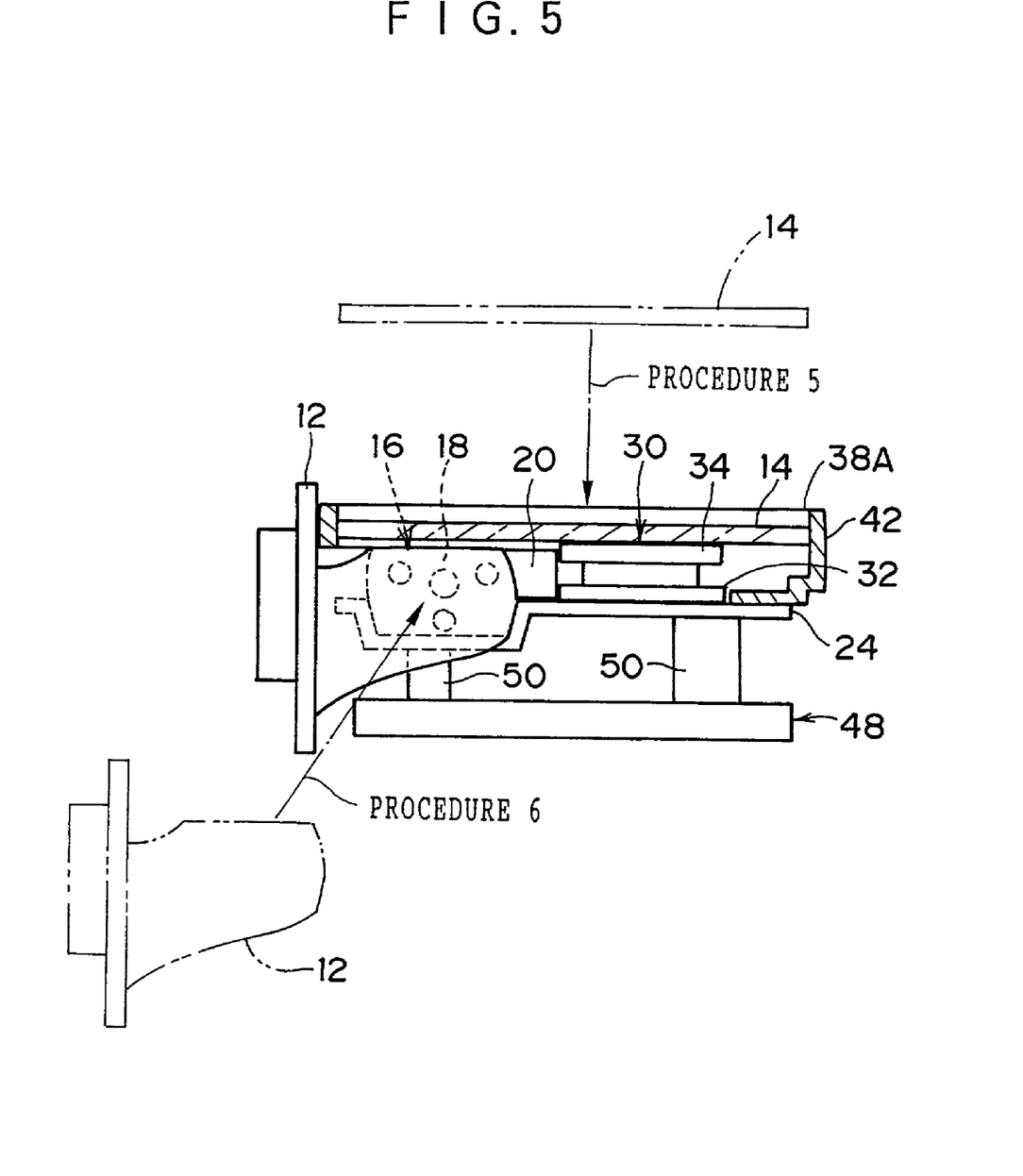
FIG. 5 is a bottom view when a mirror is mounted to the retracting unit of the vehicle mirror assembly and a door mirror stay is mounted to the mirror surface adjustment unit.

As shown in FIG. 5 in detail, the mirror 14 is mounted to the retaining plate 34 of the mirror surface adjustment unit 30 so as to be held thereby (which hereinafter is referred to as a fifth procedure). The door mirror stay 12 is fixed to the stand 18 of the retracting unit 16 by a predetermined number of screws 22 (which hereinafter is referred to as a sixth procedure).

Figure 6:
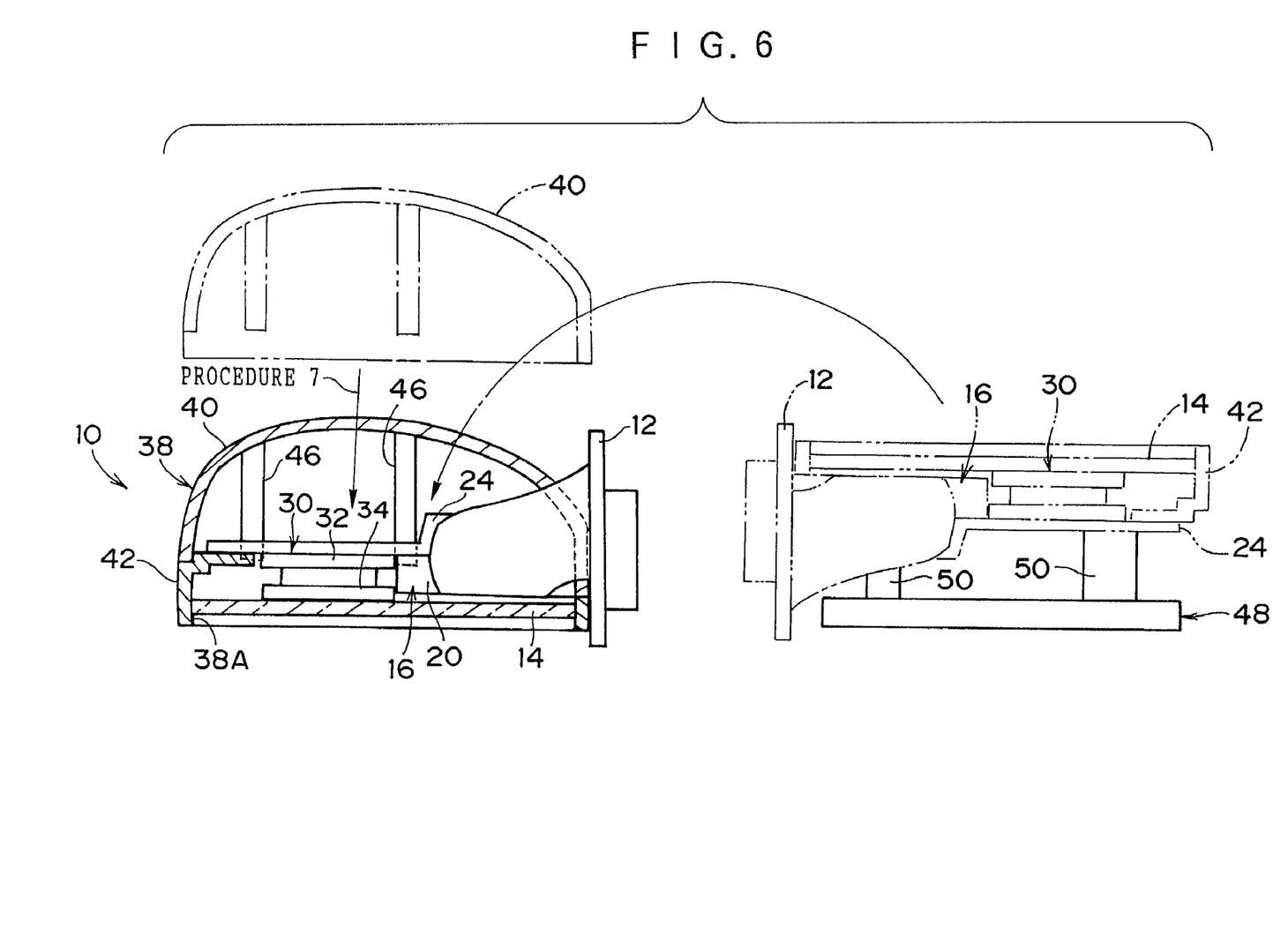
FIG. 6 is a bottom view when the bracket of the vehicle mirror assembly is removed from the bracket jig and a door mirror visor is mounted to the bracket.

Finally, as shown in FIG. 6 in detail, in a third process, the bracket 24 is removed from the bracket jig 48, then each engaging pawl 46 of the visor cover 40 is engaged with each engaging hole 28 of the bracket 24 at each hook portion 46A thereby the visor cover 40 is mounted to the bracket 24 and the visor cover 40 is fitted into the visor rim 42. In this way, the door mirror visor 38 is mounted to the bracket 24 (which hereinafter is referred to as a seventh procedure).

An order from the second procedure to the sixth procedure may be optionally exchangeable.

Here, as the bracket 24 is a component which is covered by the door mirror visor 38, the degree of freedom of a size or a shape of the bracket 24 is large unlike the door mirror visor 38 which is a component whose appearance is a design. Thus when the bracket 24 is set as an assembling reference member and is disposed on the bracket jig 48 in the first procedure as described above, portions of the bracket 24 to be positioned with respect to the bracket jig 48 (i.e., the engaging holes 28 and the positioning hole 24A) can be made common regardless of a vehicle type. As a result, a fixed bracket jig 48 can always be used. Accordingly, it is not necessary to provide a new bracket jig 48 for each vehicle type resulting in cost reduction.

Further, as the bracket 24 is a component which is covered by the door mirror visor 38, even if the bracket 24 is scratched by the bracket jig 48, the bracket 24 cannot be a defective. As described above, the door mirror visor 38 is mounted to the bracket 24 to which the retracting unit 16, the mirror surface adjustment unit 30, the door mirror stay 12 and the mirror 14 have been mounted in the last process (i.e., the seventh procedure in the third process). Thus the possibility that the door mirror visor 38 is scratched can be minimized thereby the possibility that the door mirror visor 38 becomes a defective can be reduced. As a result, the production efficiency can be improved.

The door mirror visor 38 is divided into the visor cover 40 at the vehicle front side thereof and the visor rim 42 at the vehicle rear side thereof. In the second process, the visor rim 42 is mounted to the bracket 24 (the fourth procedure). Then in the third process, the visor cover 40 is mounted to the bracket 24. In this way, mounting the door mirror visor 38 to the bracket 24 is completed (the seventh procedure). As described above, the door mirror visor 38 can be easily mounted to the bracket 24. Defects of the door mirror visor 38 due to scratches can be further reduced and the production efficiency can be further improved.

The visor cover 40 is provided with the engaging pawls 46 and the bracket 24 is provided with the engaging holes 28. By simply engaging the engaging pawls 46 with the engaging holes 28 at the hook portions 46A, the visor cover 40 is fitted into the visor rim 42 so that the door mirror visor 38 is mounted to the bracket 24 (the seventh procedure). Thus the door mirror visor 38 can be easily mounted to the bracket 24. Defects of the door mirror visor 38 due to scratches can be further reduced and the production efficiency can be further improved.

In the present embodiment, the engaging holes 28 are formed at the bracket 24, but the engaging holes may be provided at at least one of the visor rim, the retracting unit and the mirror surface adjustment unit.

Further, in the present embodiment, the visor cover 40 is provided with the engaging pawls 46 and the bracket 24 is provided with the engaging holes 28. The engaging pawls may be provided at at least one of the bracket, the visor rim, the retracting unit and the mirror surface adjustment unit. The engaging holes may be provided at the visor cover.

In the present embodiment, the retracting unit 16, the mirror surface adjustment unit 30 and the bracket 24 are separate components, but the retracting unit, the mirror surface adjustment unit, and the bracket may be integrated to form a single component. If the retracting unit, the mirror surface adjustment unit and the bracket are integrated to form a single component, the second procedure for fixing the retracting unit 16 to the bracket 24 and the third procedure for fixing the mirror surface adjustment unit 30 to the bracket 24 can be omitted.

In the present embodiment, the retracting unit 16 and the door mirror stay 12 are separate components, but the retracting unit and the door mirror stay may be integrated to form a single component. If the retracting unit and the door mirror stay are integrated to form a single component, the sixth procedure for fixing the door mirror stay 12 to the retracting unit 16 can be omitted.

In the above-described assembling method of the vehicle mirror assembly, portions of the bracket to be positioned with respect to the bracket jig can be made common regardless of a vehicle type. Thus a fixed bracket jig can always be used resulting in cost reduction.

Even if the bracket is scratched by the bracket jig, the bracket cannot be a defective. By mounting the door mirror visor to the bracket in the final process, defects of the door mirror visor due to scratches can be reduced resulting in improvement of the production efficiency.

The present invention can be applied not only to a door mirror device which is formed of the above-described two-piece type mirror visor but also to a door mirror device which is formed of a one-piece type mirror visor. Here, the one-piece type mirror visor refers to as a mirror visor which is a single component and which covers a back surface of a mirror and an outer peripheral surface of the mirror. The one-piece type mirror visor has a function of a visor rim.

The present invention can be applied to a door mirror device which has a mirror visor formed of three or more pieces.

What is claimed is:

1. A method for assembling a vehicle mirror assembly, wherein the assembly includes a mirror having an outer peripheral surface and a back surface, a mirror visor having a visor cover for covering the back surface of the mirror, a visor rim that is separate and independent from the visor cover for covering the outer peripheral surface of the mirror, a retracting unit having a plate-like stand and a rotating portion that is completely contained within said mirror visor, and a bracket that is separate and independent from said retracting unit having opposite surfaces, the method comprising the steps of:
mounting the rotating portion of the retracting unit to the bracket with at least one fastener;
mounting the visor rim to one surface of the bracket;
mounting the visor cover to one of the other surface of the bracket and the visor rim from the other surface side of the bracket, and
mounting the plate-like stand of the retracting unit to a door mirror stay with a plurality of fasteners to mount the vehicle mirror assembly to the door of a vehicle.

2. The method according to claim 1, further comprising placing the bracket on a bracket jig before mounting the visor rim to one surface of the bracket.

3. The method according to claim 2, further comprising removing the bracket from the bracket jig after mounting the visor rim and before mounting the visor cover.

4. The method according to claim 3, wherein removing the bracket from the bracket jig includes repositioning the bracket to face in the opposite direction.

5. The method according to claim 4, wherein the bracket is repositioned substantially horizontally.

6. The method according to claim 1, further comprising disposing the bracket substantially horizontally before mounting the visor rim.

7. The method according to claim 1, further comprising mounting the mirror to one surface of the bracket after mounting the visor rim before mounting the visor cover.

8. The method according to claim 7, wherein the mirror is mounted via a mirror surface adjustment unit to the bracket.

9. The method according to claim 1, wherein the recited steps are sequential.

10. A method for assembling a vehicle mirror assembly, wherein the assembly includes a mirror having an outer peripheral surface and a back surface, a mirror visor for covering the back surface and outer peripheral surfaces of the mirror, a visor rim that is separate and independent from said mirror visor for covering the outer peripheral surface of the mirror, a retracting unit having a plate-like stand and a rotating portion, said rotating portion being completely contained within the mirror visor and a bracket that is separate and independent from said retracting unit having opposite surfaces for accommodation within the mirror visor, the method comprising the steps of:

mounting the rotating portion of the retracting unit to the bracket with at least one fastener;
    mounting the mirror to one surface of the bracket;
    mounting the mirror visor to the other surface of the bracket from the other surface side of the bracket, and
    mounting the plate-like stand of the retracting unit to a door mirror stay with a plurality of fasteners to mount the vehicle mirror assembly to the door of a vehicle.

11. The method according to claim 10, further comprising placing the bracket on a bracket jig before mounting the mirror to one surface of the bracket.

12. The method according to claim 11, further comprising removing the bracket from the bracket jig after mounting the mirror and before mounting the mirror visor.

13. The method according to claim 12, wherein removing the bracket from the bracket jig includes repositioning the bracket to face in the opposite direction.

14. The method according to claim 10, further comprising disposing the bracket substantially horizontally before mounting the mirror to one surface of the bracket.

15. The method according to claim 10, wherein the mirror is mounted via a mirror surface adjustment unit to the bracket.

16. The method according to claim 10, wherein the recited steps are sequential.

17. A method for assembling a vehicle mirror assembly, wherein the assembly includes a mirror having an outer peripheral surface and a back surface, a mirror visor for covering the back surface and outer peripheral surfaces of the mirror, a visor rim that is separate and independent from said mirror visor for covering the outer peripheral surface of the mirror, a retracting unit having a plate-like stand and a rotating portion, said rotating portion being completely contained within said mirror visor, and a bracket that is separate and independent from said retracting unit having opposite surfaces for accommodation within the mirror visor, the method comprising the sequential steps of:

mounting the rotating portion of the retracting unit to the bracket with at least one fastener;
    mounting the visor rim to one surface of the bracket;
    mounting the mirror to one surface of the bracket;
    mounting the mirror visor to the other surface of the bracket from the other surface side of the bracket;
    mounting the plate-like stand of the retracting unit to a door mirror stay with a plurality of fasteners to mount the vehicle mirror assembly to the door of a vehicle, and further including the steps of
    placing the bracket on a bracket jig before mounting the mirror to one surface of the bracket;
    removing the bracket from the bracket jig after mounting the mirror and before mounting the mirror visor,
    wherein removing the bracket from the bracket jig includes repositioning the bracket to face in the opposite direction.

18. The vehicle mirror assembly according to claim 17, further comprising a mirror surface adjustment unit disposed between the bracket and the mirror and connected to the bracket and the mirror.

19. A vehicle mirror assembly comprising:

(A) a mirror having a back surface and an outer peripheral surface;

(B) a mirror visor supporting the mirror, the mirror visor having a visor cover opposing the back surface of the mirror, and a visor rim that is separate and independent from the visor cover covering the outer peripheral surface of the mirror;

(C) a bracket means for facilitating manufacture of said vehicle mirror assembly by having opposite surfaces for mounting said visor rim and said visor cover, respectively;

(D) a door mirror stay adapted to be connected to the door of a vehicle, (E) a retracting unit that is separate and independent from the bracket, said unit having a plate-like stand and a rotating portion connecting said bracket to said door mirror stay, wherein said plate-like stand is secured to said door mirror stay via a plurality of fasteners, and said bracket and said rotating portion are connected via at least one fastener, and said rotating portion of the retracting unit is completely contained within said mirror visor, and the visor rim is mounted to the surface of the bracket from the mirror side, and the visor cover is mounted from the opposite surface side of the bracket.

* * * * *